United States Patent
Konyha

[11] 3,938,400
[45] Feb. 17, 1976

[54] SINGLE LEVER FORWARD-REVERSE CONTROL

[75] Inventor: Peter P. Konyha, Port Washington, Wis.

[73] Assignee: Allis-Chalmers Corporation, Milwaukee, Wis.

[22] Filed: Oct. 2, 1974

[21] Appl. No.: 511,384

[52] U.S. Cl. ...... 74/242.1 R; 74/242.15 R; 180/6.66
[51] Int. Cl.² .. F16H 7/12; F16H 7/00; B62D 11/00
[58] Field of Search......... 180/6.66, 19; 74/242.1 R, 74/242.15 R, 4.73 P, 473 SW, 506

[56] References Cited
UNITED STATES PATENTS

| | | | |
|---|---|---|---|
| 1,160,537 | 11/1915 | Siddall | 74/242.1 R X |
| 3,052,311 | 9/1962 | Leedom | 180/6.66 |
| 3,391,807 | 7/1968 | Buschbom | 74/242.1 R X |
| 3,498,398 | 3/1970 | Burrough et al. | 180/6.66 |
| 3,515,313 | 6/1970 | Siems | 180/19 H X |

*Primary Examiner*—Leonard H. Gerin
*Attorney, Agent, or Firm*—Charles L. Schwab

[57] ABSTRACT

The forward and reverse directions of a motorized walk-behind vehicle are controlled by a walking operator through a control linkage which includes a lever pivoted on the control handle which the operator grips during operation of the vehicle. The control lever has two grip portions which are disposed in angular relation to one another and which move the control linkage for achieving forward and reverse directions of the vehicle when the grip portions are selectively pivoted toward the control handle. The control linkage is connected to a pivotable belt tightener supporting a pair of belt idlers which are selectively brought into tensioning engagement with forward and reverse belts upon pivoting the belt tightener in opposite directions. This forward-reverse control is particularly useful with a V-belt drive from an engine having two output shafts from the same side of the engine.

8 Claims, 6 Drawing Figures

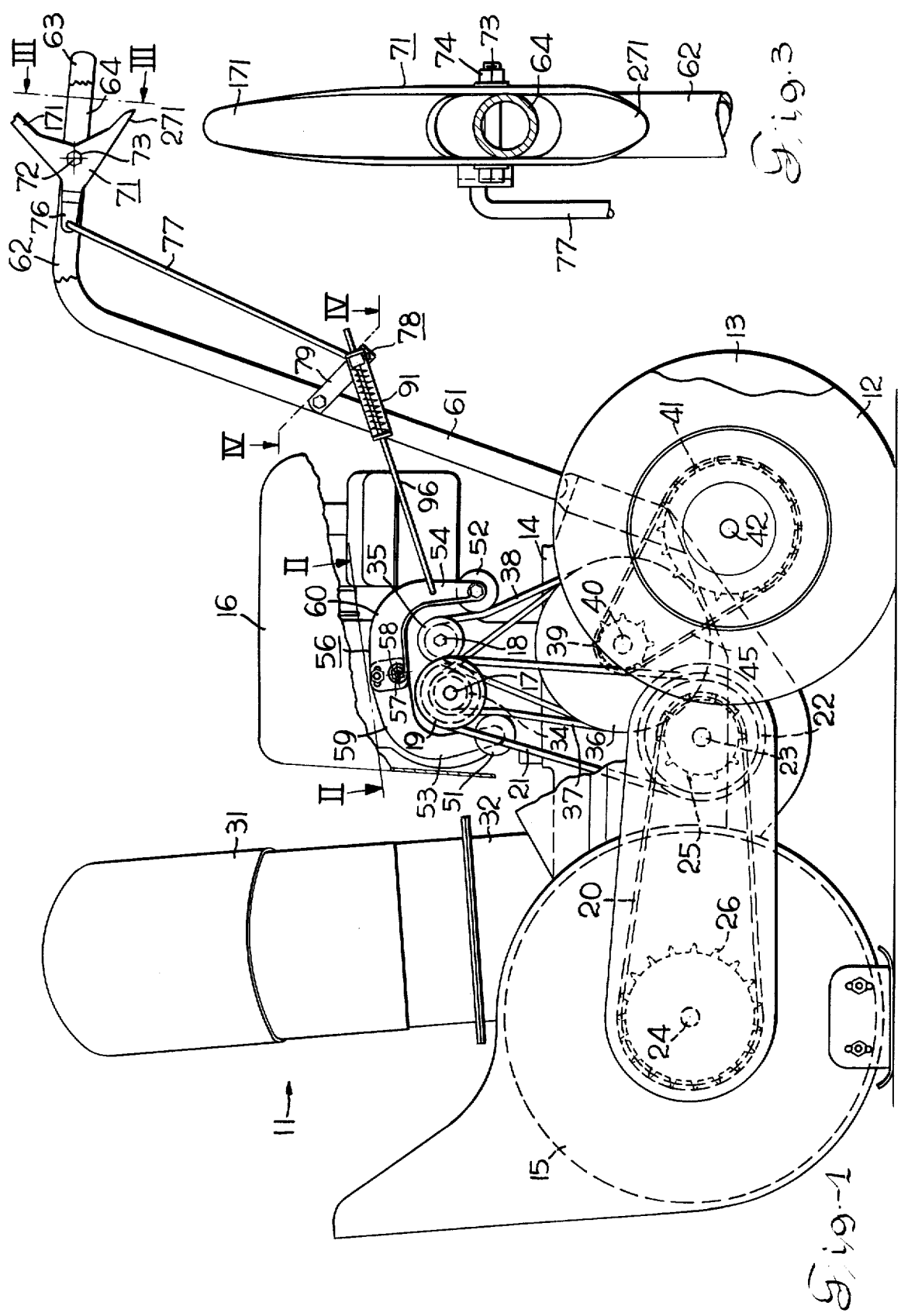

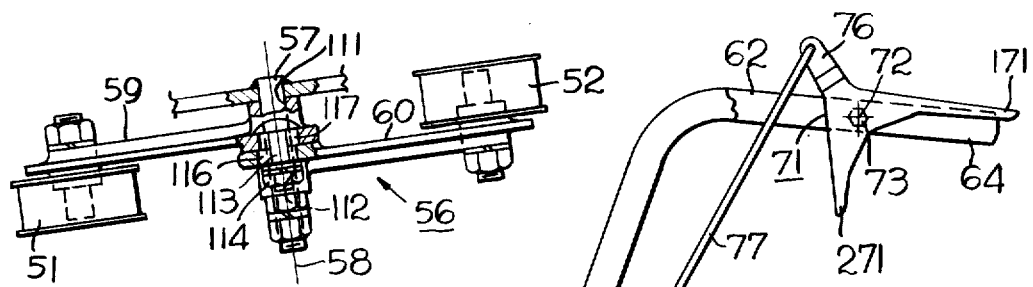
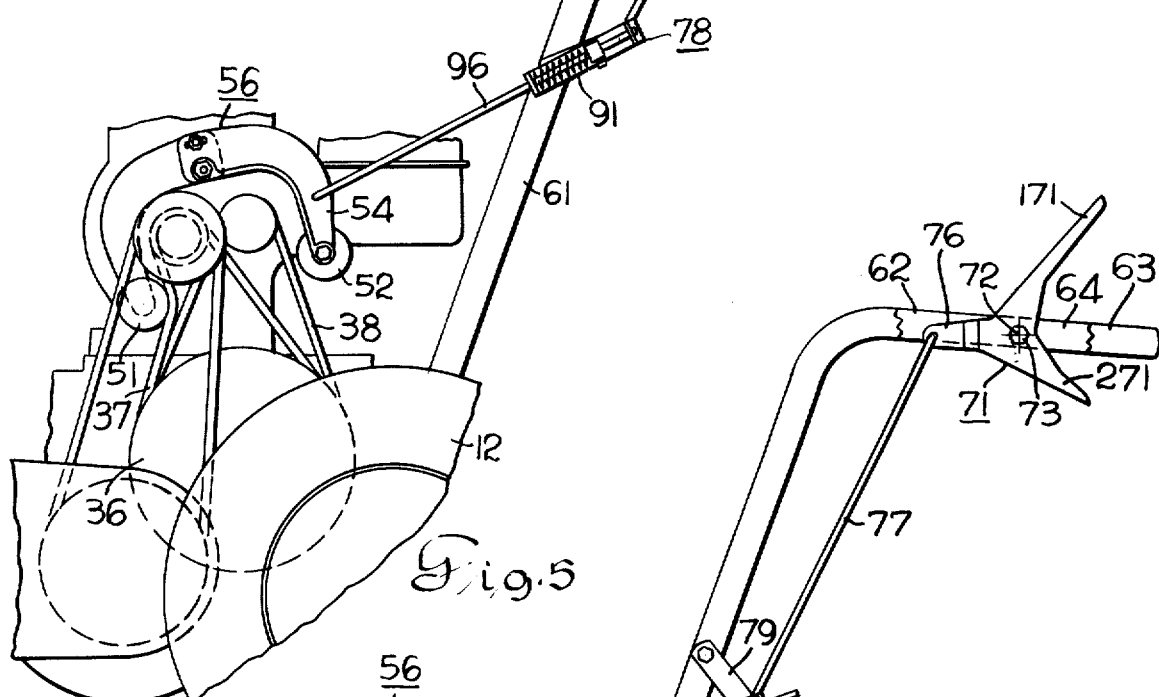
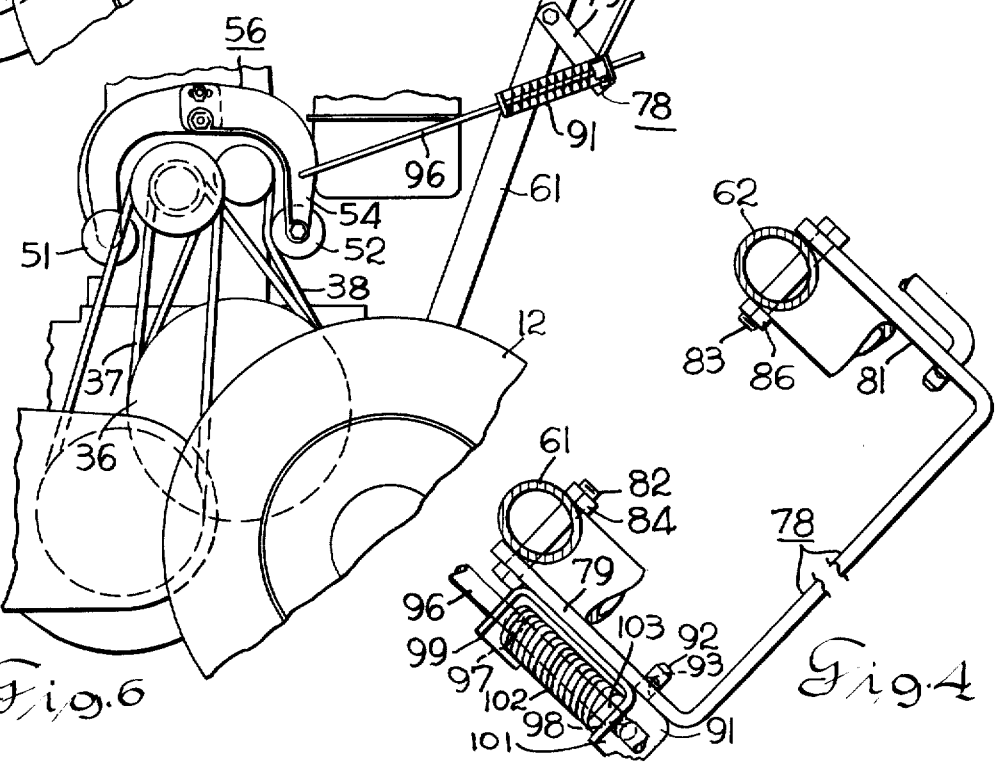

SINGLE LEVER FORWARD-REVERSE CONTROL

BACKGROUND OF THE INVENTION

Walk-behind snow blowers, rotary tillers and the like, are usually steered by a pair of laterally spaced handles which the walking operator grips. Effective control of the movement of walk-behind vehicles is best achieved if the operator maintains both hands on the handles during operation.

Heretofore, others have used or have proposed to use controls for walk-behind vehicles wherein the operator's hand for operating the forward-reverse control would need to be moved from the control handle, thus leaving only one hand for controlling steering during shifting of the direction control. It is also desirable to have a reliable trouble free forward-reverse control in a walk-behind vehicle which is easily adjusted. Heretofore, others have used forward and reverse idlers on separate pivotable idler arms. One forward-reverse control for a gear type transmission of a walk-behind vehicle is shown in U.S. Pat. 1,085,379. Forward and reverse control through rotation of a hand grip is illustrated in U.S. Pat. 2,336,642. Forward-reverse control through movement of a control lever having a single hand grip pivotally connected to a control handle is shown in U.S. Pat. 2,925,134.

BRIEF DESCRIPTION OF THE INVENTION

The forward and reverse directions of travel of a walk-behind power driven vehicle are controlled through rotation of a clutch member in the form of a pivoted belt tightener having a pair of idlers, one of which is in confronting relation to the forward drive belt and the other of which is in confronting relation to the reverse drive belt and a control linkage which includes a hand lever pivoted on the control handle of the vehicle for swinging movement about a transverse axis. The hand lever has a pair of grip portions which radiate from the transverse pivot axis and the forward and reverse directions of travel are achieved by drawing one or the other of the grip portions toward the control handle.

It is an object of the present invention to provide a forward-reverse direction control which is low in initial cost, reliable in operation, easy to adjust and which permits the operator to keep both hands on the control handles during shifting.

It is a further object of the present invention to provide a pivotable belt tightener which supports both the forward and reverse belt idlers.

It is a further object of the present invention to provide a pivotable forward-reverse belt tightener with forward and reverse idlers mounted on legs of brackets which are adjustably connected to one another.

BRIEF DESCRIPTION OF THE DRAWINGS

The drawings show the invention embodied in a snow blower wherein:

FIG. 1 is a side view of a snow blower incorporating the present invention;

FIG. 2 is a section view taken along the line II—II of FIG. 1;

FIG. 3 is a section view taken along the line III—III of FIG. 1;

FIG. 4 is a section view taken along the line IV—IV of FIG. 1;

FIG. 5 is a view of the forward-reverse control shown in FIG. 1 but showing such control in its forward drive position; and FIG. 6 is a view similar to FIG. 5 but showing the control in its reverse drive position.

DETAILED DESCRIPTION OF THE DRAWINGS

Referring to FIG. 1, a snow blower 11 incorporating the present invention includes a pair of drive wheels 12, 13 rotatably mounted on the main frame 14. The snow blower is powered by an internal combustion engine 16 mounted on the top of the frame 14. The engine 16 includes a pair of parallel output shafts 17, 18 which are disposed at the same lateral side of the engine and rotate in opposite directions. An auger 15 and a paddel wheel, not shown, of the snow blower are driven by the forward output shaft 17 through a pulley 19, a V-belt 21 and a pulley 22. The paddel wheel is connected directly to a shaft 23 to which the pulley 22 is nonrotatably secured. The auger 15 is driven through a chain 20 engaging sprockets 25, 26 on shafts 23, 24. This type of snow blower is generally described as a two-stage snow blower and is somewhat similar in arrangement to that shown in U.S. Pat. 3,805,421. The snow blower includes a snow chute 31 which is pivotally connected to an outlet 32 for rotation about a generally vertical axis. A second pulley 34 is nonrotatably secured to the forward drive shaft 17 and serves to drive a double sheave pulley 36 through a V-belt 37 which may be tightened to cause the belt to drivingly engage sheave pulleys 34, 36. Reverse drive shaft 18 selectively drives the double sheave pulley 36 by a V-belt 38 which is engagable with a pulley 35 on shaft 18 and the pulley 36. The double sheave pulley 36 is secured to a transverse shaft 40 which also carries a sprocket 39. A drive chain 45 interconnects the sprocket 39 and a sprocket 41 secured for rotation with the drive wheel 12 mounted on axle 42.

A pair of forward and reverse idler pulleys 51, 52 are rotatably mounted on downwardly disposed legs 53, 54 of a U-shaped belt tightener 56 which is pivotally mounted on the engine by a pivot bolt 57 for rotation about a common transverse pivot axis 58. As shown in FIG. 1, the belt tightener 56 is in its neutral position, the belts 37, 38 being too loose to establish drive.

As shown in FIGS. 1 and 2, the U-shaped belt tightener is made of two identical L-shaped brackets 59, 60. The brackets 59, 60 are placed in reversed relation to one another so as to align bores 111, 112 with one another on pivot bolt 57. The brackets 59, 60 are rigidly secured together by a bolt 113 and nut 114. The bolt 113 extends through horizontal slots 116, 117 in brackets 59, 60 with sufficient clearance to permit the brackets 59, 60 to be rotatively adjusted relative to one another about axis 58 upon loosening of the nut 114 on bolt 113. This adjustment of brackets 59, 60 relative to one another permits the forward and reverse idler pulleys to be adjusted to compensate for variation in length of belts 37, 38. Counterclockwise pivotal movement of the belt tightener 56, as viewed in FIGS. 1, 5 and 6, about axis 58 forces forward idler to the right tightening the V-belt and causing it to grip the V-belt sheaves to transmit forward driving torque to the wheels 12, 13. Clockwise pivotal movement of the belt tightener 56 causes reverse idler to the left thereby tightening belt 38 to cause transmittal of reverse drive torque to the wheels 12, 13.

The snow blower includes a pair of handle bars 61, 62 rigidly secured at their lower ends to the frame 14 and extending upwardly and rearwardly to terminating in handles 63, 64. As shown in FIGS. 1, 3, 5 and 6, a control lever 71 is pivotally connected at its central part to the handle 64 of handle bar 62 on a transverse pivot axis 72 by a bolt 73 and a nut 74. A forwardly extending leg 76 of the control lever 71 is pivotally connected to the upper end of a control rod 77 which, in turn, is connected at its lower end to a U-shaped lever 78, as shown in FIG. 4. The U-shaped lever 78 has its laterally spaced legs 79, 81 pivotally connected to the handle bars 61, 62 by bolts 82, 83 which are maintained in place by nuts 84, 86. Leg 79 of the control lever 78 is pivotally connected to a rod guide 91 having a pin 92 secured thereto and extending through a drilled opening 93 in leg 79. A longitudinally extending rod 96 is pivotally connected at its forward end to leg 54 of belt tightener 56 and extends rearwardly through aligned openings 97, 98 in legs 99, 101 of the guide 91. A coil spring 102 is disposed about rod 96 and abuts leg 99 of guide 91 at its forward end and a stop block 103 rigidly secured to the rod 96 at its other end.

OPERATION

During operation, the walking attendant steers the snow blower through manual effort applied to the rearwardly extending handle bars 61, 62. In walk-behind motorized vehicles such as a snow blower, it is desirable that the operator maintain both hands on the handles during the snow throwing operation, so as to insure proper steered direction. It has also been found desirable to provide a reverse travel control for the snow blower so that the snow blower is more easily manuevered and can be backed away from any obstacle. As in forward travel, it is desired that the operator keep both hands on the control handles 61, 62 to insure proper steered direction of the snow blower during reverse movement thereof. The present control arrangement allows the operator to keep both hands on the control handles 61, 62 while changing directions of travel. As shown in FIG. 1, the control lever 71 is in its neutral position as is the belt tightener 56.

When the operator opens the grip of his right hand to permit his right thumb to draw a forward hand-grip portion 171 of the control handle 71 downwardly to the position shown in FIG. 5, the control linkage comprising rod 77, lever 78 and rod 96 will move the belt tightener 56 to cause forward idler pulley 51 to swing counterclockwise to tighten the forward drive belt 37 thereby effecting forward travel. If the operator chooses to change from forward travel to rearward travel, he will release the palm and thumb of his right hand to permit the control lever 71 to come back to the neutral position and then will open his grip holding his thumb on the control handle to permit his fingers to be wrapped around the reverse grip portion 271 of the control lever 71 to pull it upwardly toward the control handle 62 to the position shown in FIG. 6 wherein the reverse idler pulley 52 has swung clockwise to tighten the reverse drive belt 38. At the same time this occurs, the forward idler pulley is moving away from belt 37 to disengage forward drive.

From the foregoing description, it is apparent that a low cost, effective forward-reverse control for a walk-behind vehicle has been provided. The novel control lever permits the operator to alternately change directions without removing his hand from the control handle to which the control lever is pivotally attached. This helps the operator to maintain effective steering control during direction changes. The novel control arrangement of this invention includes a belt tightener carrying forward and reverse idler pulleys with means for adjusting the position of the pulleys relative to one another.

The embodiments of the invention in which an exclusive property or privilege is claimed are defined as follows:

1. A forward-reverse control for a vehicle of the type having a power unit and drive means including forward and reverse drive belts connected in driven relation to said power unit, said control comprising:
    a belt tightener pivotally mounted on said vehicle having forward and reverse idler pulleys in confronting relation to said forward and reverse belts, respectively, whereby pivotal movement of said tightener in one direction effects forward drive and pivotal movement in the opposite direction effects reverse drive,
    a control handle,
    a control lever pivotally connected to said control handle on a horizontal axis including a pair of angularly disposed grip portions extending radially from said horizontal axis whereby said grip portions may alternately be pivoted toward said handle with a single hand without requiring said hand to be completely removed from said handle, and
    a linkage interconnecting said control lever and said belt tightener whereby pivoting one of said grip portions toward said handle effects forward drive and pivoting the other of said grip portions toward said handle effects reverse drive.

2. The control of claim 1 wherein said control handle is substantially horizontal and said grip portions are disposed on vertically opposite sides of said handle.

3. The control of claim 1 wherein said belt tightener includes a U-shaped structure presenting a pair of legs and wherein said forward and reverse idler pulleys are rotatably connected to the ends of said legs, respectively.

4. The control of claim 3 wherein said U-shaped structure includes a pair of L-shaped brackets having corresponding ends pivotally connected to said vehicle on a common axis and releaseable fastening means adjustably connecting said brackets to one another whereby the latter may be selectively adjusted relative to one another about said common axis.

5. A forward-reverse control for a vehicle of the type having a power unit and drive means including forward and reverse drive belts connected in driven relation to said power unit, said control comprising:
    a belt tightener pivotally mounted on said vehicle including
        a pair of brackets having adjacent ends pivotally connected to said vehicle on a common axis,
        releaseable fastening means adjustably connecting said brackets to one another whereby the latter may be selectively adjusted relative to one another about said common axis, and
        forward and reverse idler pulleys rotatably connected to said brackets, respectively, in confronting relation to said forward and reverse belts, respectively, and
    manual control means operatively connected to said belt tightener and operable to pivot said tightener in opposite directions to effect forward and reverse drive, respectively.

6. The control of claim 5 wherein said power unit is an engine having a pair of oppositely rotating output shafts with pulleys driving said belts, respectively, and wherein said belt tightener is pivotally mounted on said engine above said output shafts and said idler pulleys are disposed below said shafts.

7. In a forward-reverse control for a vehicle, the combination comprising:

A horizontally extending control handle, a control lever pivotally mounted on said control handle on a transverse axis including a pair of grip portions extending radially from said axis on opposite vertical sides of said control handle whereby the operator's hand may alternately move said grip portions toward said handle without entirely removing said hand from said handle.

8. The combination of claim 7 wherein said lever includes a leg extending radially from said axis adapted for connection to a forward-reverse control rod.

* * * * *